(12) United States Patent
Petkov et al.

(10) Patent No.: US 8,304,115 B1
(45) Date of Patent: Nov. 6, 2012

(54) MULTI LAYER CERAMIC BATTERY

(75) Inventors: Kostadin Petkov, San Diego, CA (US); Mark Wesselmann, Carlsbad, CA (US)

(73) Assignee: Cermacell, LLC, Vista, CA (US)

( * ) Notice: Subject to any disclaimer, the term of this patent is extended or adjusted under 35 U.S.C. 154(b) by 0 days.

(21) Appl. No.: 12/584,065

(22) Filed: Aug. 28, 2009

(51) Int. Cl.
*H01M 10/05* (2010.01)
(52) U.S. Cl. ........................................ 429/304
(58) Field of Classification Search ................ None
See application file for complete search history.

(56) References Cited

FOREIGN PATENT DOCUMENTS

EP          1826861 A1 *  8/2007

* cited by examiner

*Primary Examiner* — Patrick Ryan
*Assistant Examiner* — Wyatt McConnell
(74) *Attorney, Agent, or Firm* — The Maxham Firm (57) ABSTRACT

A practical solid-state battery composed primarily of ceramic or glass materials and containing no liquid, gel or polymeric electrolytes. The invention utilizes solid-state electrolyte materials with solid-state anode and cathode materials along with construction concepts utilized in the multi layered ceramic capacitor (MLCC) industry to result in a compact primary or secondary battery.

16 Claims, 7 Drawing Sheets

MULTI LAYER CERAMIC BATTERY

FIELD OF THE INVENTION

This invention relates to the field of electrical energy storage devices and, more particularly, to solid-state batteries.

BACKGROUND OF THE INVENTION

Rechargeable lithium batteries are the electrical energy storage devices of choice for many energy storage applications because they have the highest energy density of all known batteries. The most common rechargeable lithium batteries are composed of lithium intercalating transition metal oxides, exemplified by lithium cobalt dioxide ($LiCoO_2$), as cathodes, and either lithium intercalating carbon and metal oxides such as lithium titanium oxide ($Li_4Ti_5O_{12}$) or metallic lithium (Li) as anodes.

There are different types of rechargeable lithium batteries classified according to the type of electrolytes they contain. The most common rechargeable lithium batteries, known as lithium ion (Li-ion) batteries, as used to power laptop computers, cell phones and digital cameras, contain organic liquid electrolytes. Other types of rechargeable batteries are based on organic polymer or gel polymer electrolytes and utilize the same kinds of anodes and cathodes as those in the liquid electrolytes. Further types of rechargeable batteries are based on inorganic solid-state electrolytes, again with lithium intercalating transition metal oxides as cathodes and either lithium intercalating transition metal oxides or lithium metal as anodes.

A major drawback of rechargeable lithium batteries containing organic electrolytes whether they are liquid, gel polymer or solid polymer electrolytes is flammability hazard and as a result a solid-state rechargeable lithium battery utilizing all inorganic materials as electrolyte and electrodes has been a desirable concept for many years.

Conventional inorganic solid-state lithium batteries are thin film devices as described in a review by Nancy Dudney in Materials Science and Engineering, volume B116, pages 245-249 (2005). In order to fabricate these batteries, the cathode and anode electrodes and the solid-state electrolytes are deposited layer by layer by magnetron sputtering or other vacuum deposition technique. The anode, the solid electrolyte and the cathode layers are usually a few microns thick each. Also the anode and cathode layers do not contain any electrolyte in them and ion transport through the anode and cathode layers necessary to carry out battery discharge and charge take place in the crystal lattices of the electrode material themselves. As a result, thicker layers of the anode and cathode electrodes cannot be used in these thin film batteries because they will increase the internal resistance of the battery and limit performance including power output and the energy density. These conventional solid-state batteries are considered thin film two-dimensional batteries with low power and energy densities limiting their applications to low power consuming devices such as radio-frequency transmitters, backup power for CMOS memory devices, EKG and other medical sensors, and MEMS devices. Many U.S. patents including, U.S. Pat. Nos. 4,826,743; 5,314,765; 5,338,625; 5,512,147; 5,561,004; 5,567,210; 5,569,520; 5,597,660; 5,612,152; 5,705,293; and 6,398,824, describe various modifications of two-dimensional solid-state thin film lithium batteries. All of the solid-state batteries or improvements described in these patents have the general features of thin film electrode and electrolytes deposited layer by layer by a high vacuum deposition technique.

DESCRIPTION OF THE INVENTION

For high energy and power applications such as in laptop computers, cell phones or electric vehicles, three-dimensional solid-state batteries with thicker anode and cathode layers leading to higher energy density are desired. In this connection, a new type of solid-state Li-ion batteries with thicker anodes and cathodes having larger capacities, and consequently higher energy and power densities, has been developed, and which can be fabricated inexpensively using known ceramic processing technologies, which are simpler and less expensive than thin film fabrication technologies.

An object of the present invention is to provide a rechargeable solid-state lithium battery comprising a tri-layer ceramic structure in which a dense impermeable middle electrolyte/separator layer is sandwiched by two porous layers into which appropriate lithium intercalating negative and positive electrode materials are incorporated to form a Li-ion battery. This multi-layer ceramic battery (MLCB) utilizes inexpensive ceramic processing technologies to fabricate the unit cell structure and to in situ synthesize Li-ion battery electrodes in the pores of anode and cathode layers from appropriate chemical precursors. The present invention provides a practical, high energy density, solid-state battery constructed by combining lithium ion conducting solid-state electrolyte materials, such as lithium aluminum titanium phosphate (LATP) and lithium aluminum germanium phosphate (LAGP) compositions and electrode materials that are used in fabricating lithium ion batteries.

Although examples of such lithium ion conducting solid-state electrolyte materials have been disclosed, for example, in U.S. Pat. Nos. 4,009,092, 4,985,317, 5,702,995, and 6,030,909, and in the journal publication (H. Aono, E. Sugimoto, Y. Sadaoka, N. Imanaka and G. Adachi, "Ionic conductivity of solid electrolytes based on lithium titanium" *J. Electrochem. Soc.*, 136(2) 590-591 (February 1989)), practical MLCB solid-state batteries with these materials have not been previously disclosed.

In addition, a recently issued U.S. Pat. No. 7,510,800 discloses a purported all solid-state battery, but it appears to require a metal housing and the addition of water, and the electrolyte is not a dense ceramic material.

A second object of this invention is to provide solid-state rechargeable Li-ion batteries having a cell structure that can be fabricated with any Li-ion conducting solid electrolytes and lithium intercalation cathode and anode electrodes and which have performance capability over a wide temperature range A third object of this invention is to provide a method of fabrication of single cell and multi-cell MLCB solid-state batteries utilizing the MLCB cell fabrication techniques Thus, in one aspect, the present invention provides a solid-state multi layer ceramic battery comprising at least one multi-layer cell structure wherein said multi-layer cell structure comprises a porous sponge ceramic anode layer comprising at least one anode active material, a porous sponge ceramic cathode layer comprising at least one cathode active material, and a dense ceramic electrolyte layer positioned between said anode layer and said cathode layer.

Other aspects of the invention provide a plurality of such multi layer cell structures arranged either in series or in parallel to provide batteries having greater power or capacity, respectively.

DETAILED DESCRIPTION OF THE INVENTION

As will be seen from the within description, and by reference to the drawing, in one aspect, the present invention provides a solid-state multi layer ceramic battery comprising at least one multi-layer cell structure wherein said multi-layer cell structure comprises a porous sponge ceramic anode layer comprising at least one anode active material, a porous sponge ceramic cathode layer comprising at least one cathode active material, and a dense ceramic electrolyte layer positioned between said anode layer and said cathode layer.

Other aspects of the invention provide a plurality of such multi layer cell structures arranged either in series or in parallel to provide batteries having greater power or capacity, respectively.

Figure 1:
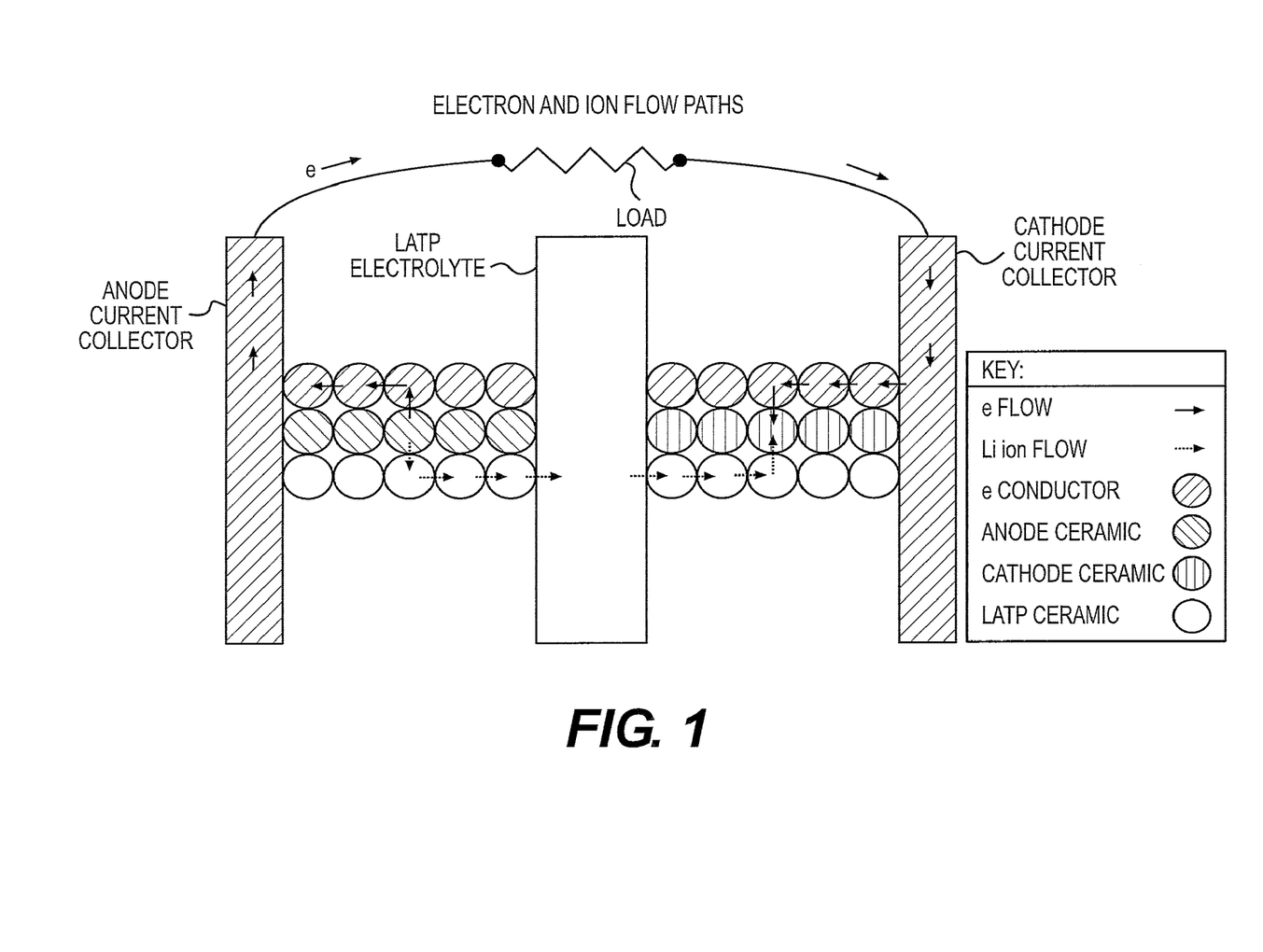
FIG. 1 is a schematic diagram of electrons and ions moving through anode and cathode portions of a battery.

For a high performance battery, electrons and ions must be able to move freely through the anode and cathode portions of the battery (FIG. 1). In conventional solid-state batteries very thin electrode layers of a few microns thickness have been used. The electrode layers in such conventional batteries do not contain electrolyte and as a result resistance to ion flow is high. This deficiency has led to the fabrication of solid state batteries with thin film anode and cathode layers each of a few microns thick leading to batteries with lower energy density and low power outputs. In order to increase energy density with free movement of electrons and ions in some past practice, solid-state ionically conducting or electronically conducting powders have been blended within the anode or cathode material. This practice considerably dilutes the active anode and cathode material and does not allow performance adequate to yield a high energy density practical battery with performance desired for many applications of lithium ion batteries.

Figure 2:
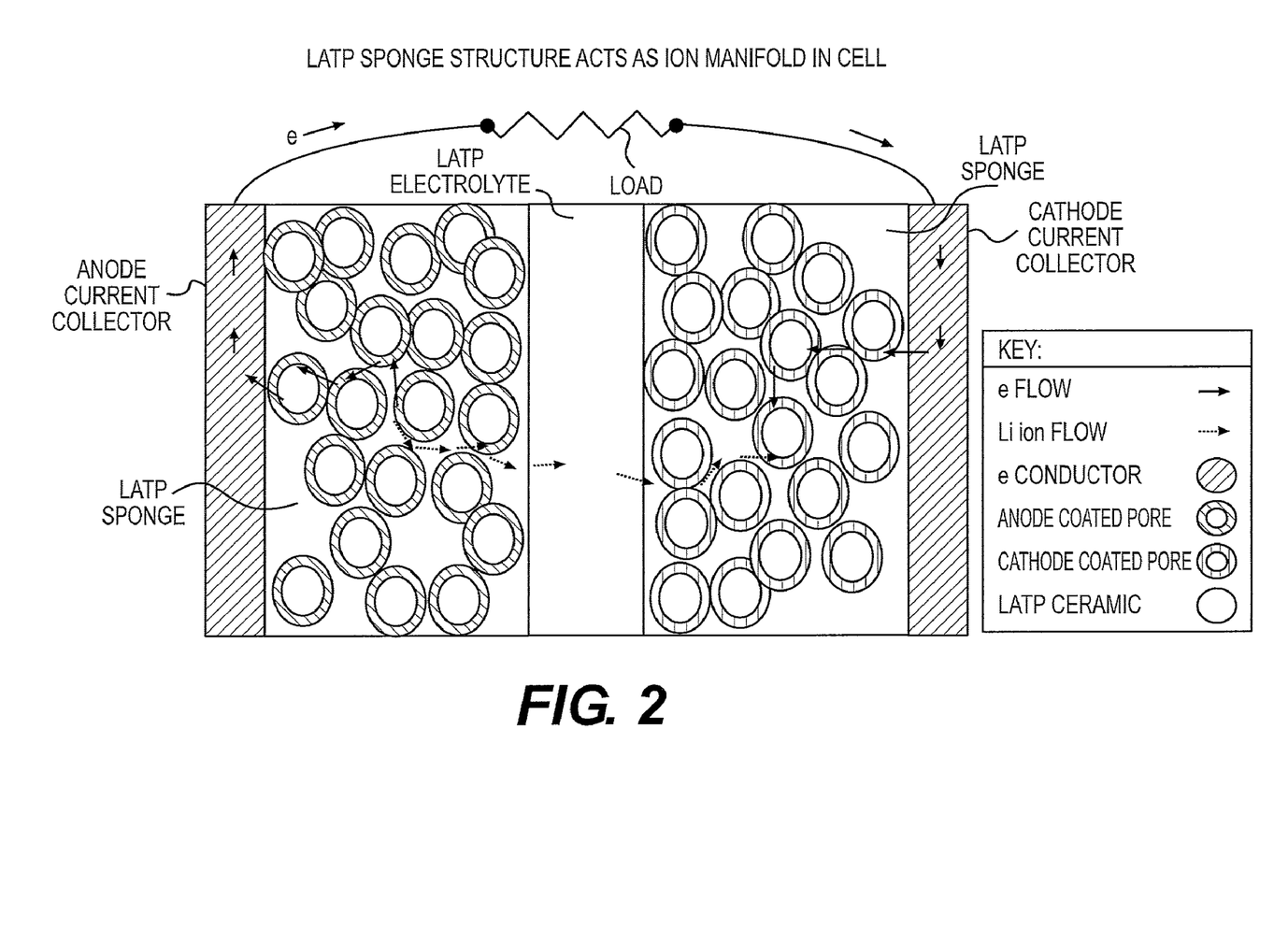
FIG. 2 is a schematic diagram of the porous "sponge structure" within a cell of the present invention to provide improved ionic conductivity.

Embodiments of the present invention allow performance enhancements in a solid-state Li-ion battery by utilizing a "sponge structure" (FIG. 2) for the anode and cathode electrodes within the cell structure to provide improved ionic conductivity in the anode and cathode leading to high discharge power and energy density for the battery. Said structures consist of porous solid-state ion conducting layers bonded to either side of a dense middle layer. The dense middle layer provides the solid electrolyte separator for the battery while the bonded porous layers act as an effective ion manifold via a skeleton of three dimensional ion conducting webs to contain the electrode materials. The anode and cathode electrode materials are synthesized in place from liquid anode and cathode precursor materials impregnated into the porous layers. Alternatively, one can employ very fine (e.g. <1 micron) colloidal suspensions of the appropriate materials.

As used in the present specification, "porous" (or spongy) and dense are relative interrelated concepts, where the term dense is taken to mean that the ceramic material is fired without any steps being taken to create and maintain pores therein. Porous, on the other had, is taken to mean that the ceramic material has been formulated or treated to include some means of pore formation and maintenance, where the dimensions of such pores can vary widely, for example from 0.01 to 100 microns.

An appropriate reaction of the precursor materials in each of the porous layers form the active anode material within the pores of the porous layer on one side of the middle solid electrolyte and cathode materials in the pores of the porous layer on the other side of the middle solid electrolyte layer. A further benefit of this manner of construction is the ability of the partially filled pores to provide stress relief as active anode or cathode materials shrink or grow during charging or discharging cycles. This advantage of the MLCB battery is especially important in view of U.S. Pat. No. 7,524,577, which teaches that prior art thin film solid state batteries have to incorporate special features in the cell structure to accommodate stress relief and obtain good battery performance. The present invention eliminates the need for such special features-induced stress relief in the construction of solid-state batteries, thereby minimizing potential failure points in the battery and increasing battery life. The avoidance of special features in the cell construction increases the energy density of the cell also. The sandwich structure of the MLCB battery of the present invention can be formed by using tape cast materials, or screen printing methods, or combinations of each or other methods well known in the ceramic industry to deposit materials in layers. The pores in the porous layers can be incorporated by adding materials, which are removed upon thermal treatment leaving pores for anode, and cathode materials.

Another embodiment providing for ion conduction throughout the structure is to coat the particles of anode or cathode with a low firing sol gel based on an LATP or LAGP composition. In such embodiments, care must be taken with the temperature utilized to properly sinter the LATP or LAGP in order to avoid adverse reactions between the LATP or LAGP and the anode or cathode materials.

It is preferable to use anodes and cathodes which are electronically conducting. However it is also possible to enhance electronic conduction in some electrodes by a second liquid thin coating of electronically conducting material or precursor material such as gold, carbon, ruthenium oxide or similar over the electrode coating already in the pore. Likewise an ion conducting film such as mentioned above could be added as a second or third coating if further ion conduction enhancement is desired.

Figure 4:
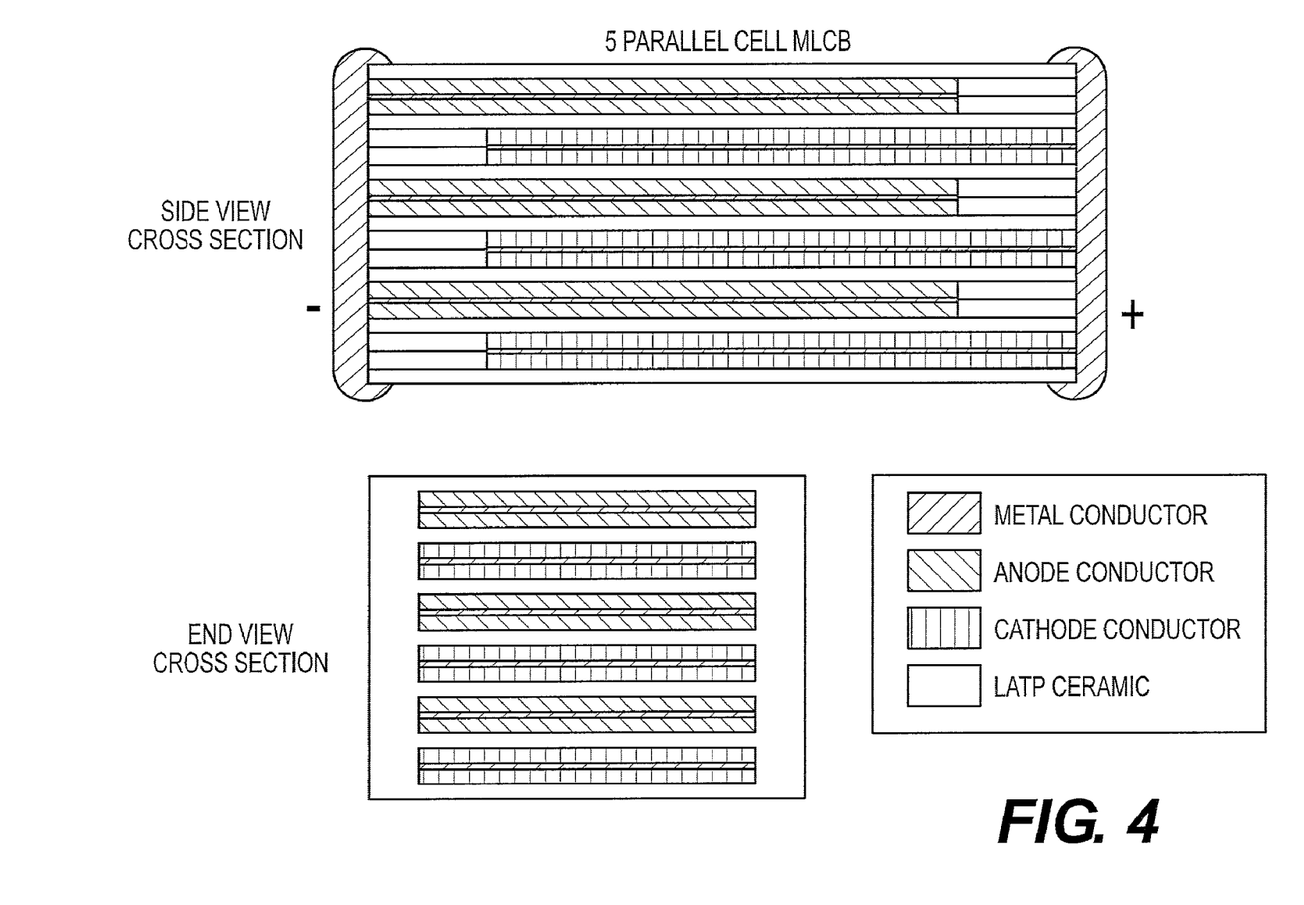
FIG. 4 is a schematic diagram of a multi-layered device comprising a plurality of trilayer cells with parallel internal cell units in accordance with the present invention.
Figure 5:
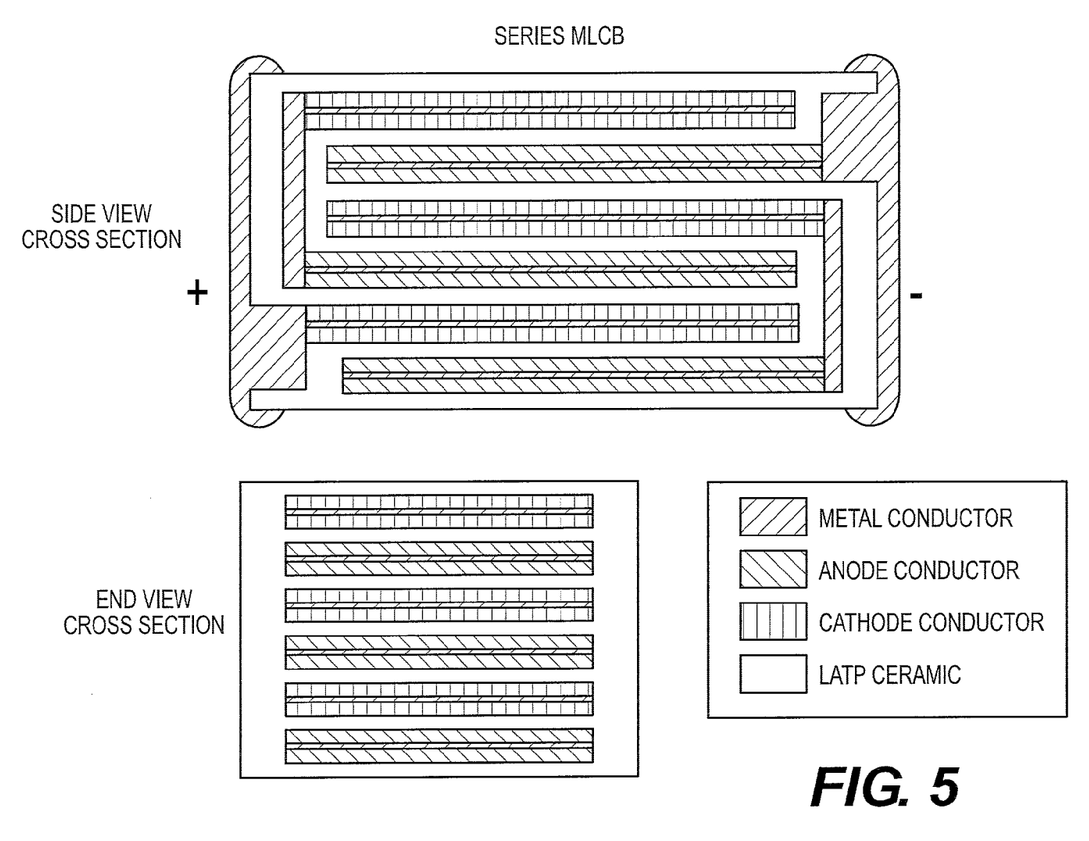
FIG. 5 is a schematic diagram of a multi-layered device comprising a plurality of trilayer cells with internal cell units in series in accordance with the present invention.

A battery utilizing the sandwich structure of the present invention could be a simple trilayer cell construction (FIG. 3) or a multi layered device with either parallel internal cell units (FIG. 4) or cell units in series (FIG. 5). Such cells connected in parallel provide batteries with higher capacities in proportion to the number of parallel cells and those connected in series provide batteries with higher voltages in proportion to the number of series connected cells. The cells can have internal metal current collectors, which join to external current collectors or battery poles, or if the anode and cathodes are sufficiently electronically conductive, internal current collectors can be eliminated. The multi-layered structure of the present invention offers an extremely compact ceramic construction, which can comprise dozens or even hundreds of layers of internal parallel or series battery cell plates. As a further advantage, the ceramic battery structure itself would form its own hermetic housing. Some simple trilayer cells can also be coated with epoxy or sputtered with metal to cover open electrode surfaces.

The advantages obtained through the use of the present MLCB invention would include batteries of dependable solid-state construction, which would provide extremely compact devices capable of standard solderable surface mount placement like other ceramic chip components. Further, as there are no hazardous or flammable electrolytes, the MLCB would be safer than a typical Li ion battery. If the present device were crushed or punctured, the battery would be expected to shatter into many fragments maintaining separation of opposite electrodes. Another potential advantage of the present solid-state electrolyte is the expectation of enhanced current capabilities at high temperatures, due to an expected solid-state ionic conduction mechanism compared to a liquid conduction as in other batteries. Due to the absence of liquid electrolyte and moisture or oxygen sensitive materials, it is expected that processing of the present devices would be achieved under normal ambient conditions using equipment used in the multilayer capacitor industry.

The present invention is not limited to LATP solid-state electrolytes. Other solid-state electrolytes can be used to construct either the porous electrode layers or the dense electrolyte layers or both. They include lithium aluminum titanium phosphate electrolytes in which some or all of the titanium is replaced by zirconium, silicon, germanium or zinc as described by J. Fu, U.S. Pat. No. 6,485,622 or the lithium phosphorous oxynitride electrolytes commonly known as LIPON mentioned in several of the patents cited in this disclosure.

In general any anode and cathode materials used to construct a liquid electrolyte based Li-ion battery can be used to build the MLCB battery. The cathode material for the MLCB battery is selected from any lithium intercalating electrode materials commonly used to construct liquid electrolyte based Li-ion batteries including $LiCoO_2$, $LiNiO_2$, $LiNi_xCo_yO_2$, $LiMn_2O_4$, $LiNi_{0.5}Mn_{1.5}O_4$, $LiNi_xCo_yMn_zO_2$, $LiFePO_4$ and other metal phosphates such as $LiCoPO_4$ and $LiNiPO_4$, lithium vanadium oxides, $Li_xV_2O_5$, and lithium titanium oxides, $Li_xTiO_2$.

The anode active materials comprise lithium intercalating carbonaceous materials such graphite, hard carbon or carbon nano tubes and lithium intercalating transition metal oxide such as molybdenum, tungsten and ruthenium oxides, titanium oxides including indium tin oxide, lithium titanium oxide of the compositions, $Li_xTiO_2$ and $Li_4Ti_5O_{12}$ and lithium alloys such as $Li_xSi$, $Li_xSn$ and $Li_xAl$, generally used for building liquid electrolyte based lithium ion batteries.

EXPERIMENTAL

The following examples are provided by way of illustration, to illuminate various aspects of the present invention, and should not be considered as limiting the scope of the invention or the range of embodiments capable of being provided thereby.

Comparative Example 1

Fully Solid State Structure

An LATP dense tape (Tape #1) was created by taking 142.24 g of LATP powder and combining with 7.12 g of DS001 dispersant (available from Polymer Innovations Inc. (PII)), 1.76 g of PL005 plasticizer (from PH), 1.44 g of DF002 defoamer (from PII), 17.76 g of AD036 modifier (from PII), 35.52 g of acrylic water based binder solution WB40B-53-15 (from PII) and 88.88 g of deionized water in a ball mill. The ball mill was rotated to provide milling for 16 hours.

After 16 hours of milling, the ball mill was opened and 103.84 g more of WB40B-53 binder and 1.44 g more DF002 were added, the mill closed and milling continued for 4 hours. After this milling, the liquid slip was poured from the mill and allowed to de-air by sitting for several hours, followed by casting using a tape-casting machine to result in a green tape having a thickness of about 30 microns.

Following the methods outlined for Tape #1, an anode containing tape (Tape #2) was formed by substituting lithium titanium oxide ($Li_4Ti_5O_{12}$) for LATP. Similarly a cathode tape (Tape #3) was formed by substituting lithium iron phosphate (LFPO) for LATP.

A cell was created by laminating (at 5000 psi 70° C. for 10 minutes) the three tapes into a bar. Tape #1 formed the center of the bar and Tapes #2 and #3 were on opposite sides of the Tape #1 center core. It is very desirable to prevent Tapes #2 and #3 from touching each other at the edges of the bar. The bar was cut on a heated stage with a razor blade into several individual 1'×1' squares. The squares were fired in an argon atmosphere at 750° C. for an hour.

The structures were removed from the furnace and gold metal was sputtered on the opposite sides to act as current collectors. Wires were connected to the current collectors via an epoxy filled with palladium metal powder. The battery was charged with about 4 volts for an hour, the charging was stopped and the voltage was measured at about 0.3 volts. However, the battery would not light an LED even when several squares were wired in series to achieve a voltage of greater than 4 volts.

Example 2

Sponge Sandwich Trilayer Structure with Carbon Anode

A porous LATP tape was prepared following the procedure used to make Tape #1 in Example 1. The porous tape (called Tape #4) was prepared in a similar manner as Tape #1 except the formula placed in the ball mill was 22.0 g of LATP material, 0.30 g of DF002 defoamer (from PII), 2.70 g of AD036 modifier (from PII), 8.0 g of acrylic water based binder solution WB40B-53 (from PII) and 27.0 g of Deionized water. The ball mill was rotated to result in milling for 16 hours.

After 16 hours of milling, the ball mill was opened and 14.7 g more of WB40B-53 binder, 25.00 g of dry 7 micron diameter crosslinked polymethyl methacrylate (PMMA) beads (to act later as pore formers in the tape) and 0.30 g more DF002 were added, the mill closed and milling continued for 4 hours. After this milling the liquid slip was poured from the mill and allowed to de-air by sitting for several hours followed by casting using a tape-casting machine to result in a green tape thickness of about 30 microns.

The single cell sandwich type battery structure was made beginning by softly laminating (at 1000 psi 70° C. for about 10 minutes) about 4 layers each of dense Tape #1 so the resulting dense tape laminate is about 120 microns thick. This is repeated two more times so there are a total of three separate soft laminates of dense Tape #1. Finally a last porous laminate is made by repeating the soft lamination procedure using porous Tape #4. It is deemed desirable that the porous laminate is the same thickness as the dense laminates.

Figure 3:
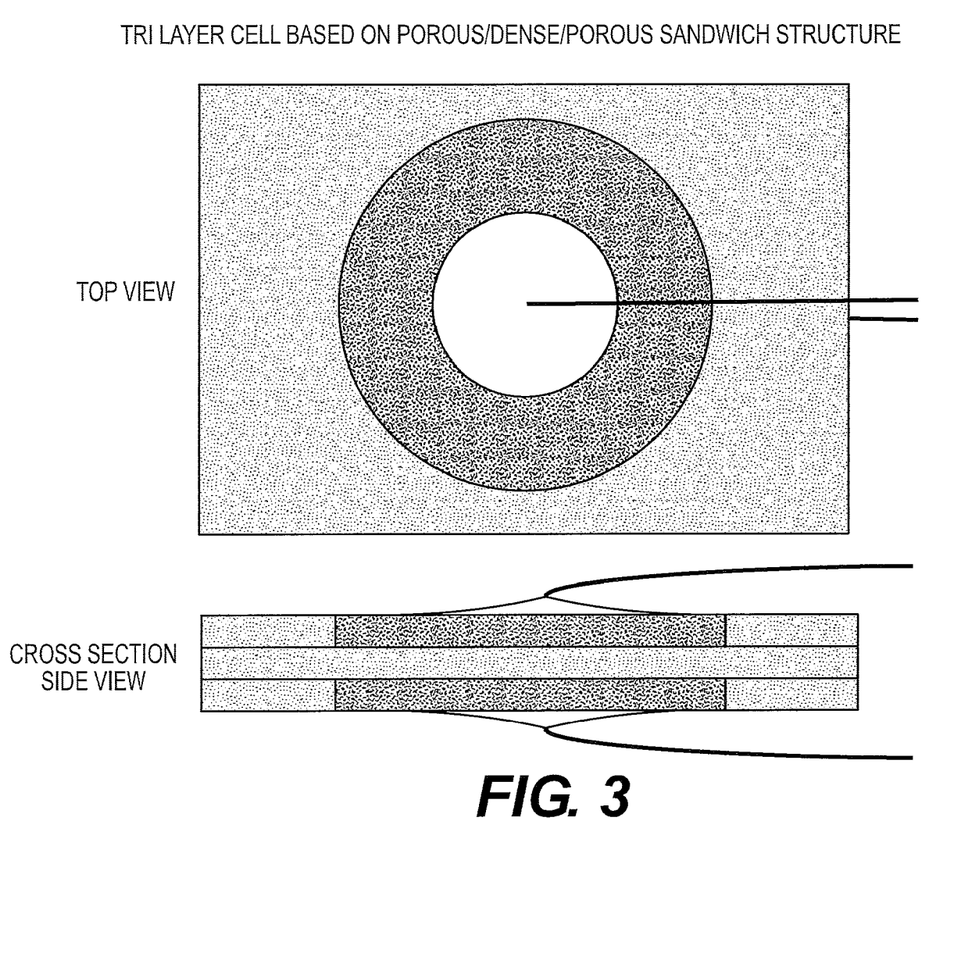
FIG. 3 is a schematic diagram of a trilayer cell device in accordance with the present invention.

After the three dense tape laminates and 1 porous laminate are created, these layers are assembled to form the sandwich structure as illustrated in FIG. 3 by placing two of the dense laminates on top of one another and punching a hole through both layers with a punch, such as a round 1" diameter arch punch (other shapes and sizes could be used). It is considered desirable that the hole not be located up against an edge but that the hole has a margin of material around it, as this will later form a well for the porous portion of the cell.

Next two holes of approximately the same size as were cut into the dense sheet should be cut into the porous laminate. The final assembly takes place by taking one of the dense laminates and removing the portion of tape which was cut out with the arch punch leaving a 1" diameter hole. This empty hole in the dense laminate is then filled by placing a hole cut from the porous plate into the cavity. The next (or middle) layer of the construction is formed by placing a dense laminate with no holes on top of the bottom layer. The top and final layer is substantially identical to the bottom layer, again filling the hole cut out of the dense layer with a porous tape insert. The porous filled holes in the top and bottom layers should be approximately aligned so they are opposite one another with the dense layer separating them, and the structure is then finally laminated into one piece by pressing it at 5000 psi 70° C. for 10 minutes.

It is also desirable to make a number of these opposing cells in a large laminate and cutting them into individual cells after lamination. This LATP final laminate is fired at about 1000° C. in air for about half an hour to result in the final "all LATP" structure with a central element consisting of two highly porous LATP layers on opposite sides of a dense LATP layer. This element is integral and contained around the perimeter by all dense LATP to keep later liquids, which are impregnated into the porous layers, from diffusing outside of the active elements.

The fired structure should now be treated with anode and cathode precursors to make an active cell. The cathode solution (cathode solution #1) was prepared by dissolving 5.82 g of cobalt nitrate $(Co(NO_3)_2)$ and 1.38 g of lithium nitrate $(LiNO_3)$ in 4 g of Deionized water. The anode solution (anode solution #1) was prepared by dissolving an epoxy Novolac resin with stoichiometric amount of polyamine curing agent in about an equal amount of acetone.

The anode solution #1 was dispensed onto one of the porous LATP elements of the sandwich structure or cell until saturated. The cell was dried in an oven at about 125° C. for an hour to remove the acetone and cure the epoxy within the pores of the LATP ceramic. The cell was placed in an atmosphere-controlled kiln and fired at 700° C. for one hour in a nitrogen atmosphere. The epoxy is converted to a carbon material in this operation and this is now the anode of the cell.

The cathode solution #1 is dispensed on the porous section opposite the anode side previously prepared in a similar manner of saturation of the porous LATP layer followed by drying at 125° C. with final treatment by placing in preheated kiln at 700° C. for 5 minutes. This heat treatment transforms the lithium and cobalt nitrates into black LiCoOxide cathode material. It is also possible to effect the transformation of the nitrates into oxides by manually playing a propane torch over the layer until the color goes from red to the black color of the anode. Both anode and cathodes were seen to be electronically conductive and the Li ion conduction is provided by the porous LATP substrate the ions are deposited within.

Wires were then attached to the anode and cathode surfaces by bonding with a conductive epoxy formed by making a one-part epoxy and blending in submicron palladium metal powder. The battery was charged with about 4 volts for an hour, the charging was stopped and the voltage was measured at about 3.6 to 3.7 volts. The battery had enough current to light a commercial 2.1V 25 mA 6.3 mcd green LED. The battery was allowed to discharge by being connected to the LED for an hour and the process was repeated. The battery was able to repeat the performance showing ability to recharge.

Example 3

Sponge Sandwich Trilayer Structure with Indium Tin Oxide Anode

Another LATP sandwich structure was created using the procedure as outlined in Example 2. In this Example 3, the anode was formed by using an anode solution #2 created by dissolving 3.52 g of indium nitrate $(In(NO_3)_3)$ and 0.19 g of tin chloride $(SnCl_2)$ in 3.71 g of deionized water. This solution was applied to one of the porous elements of the cell until saturated followed by drying in a 125° C. oven for about an hour.

Figure 6:
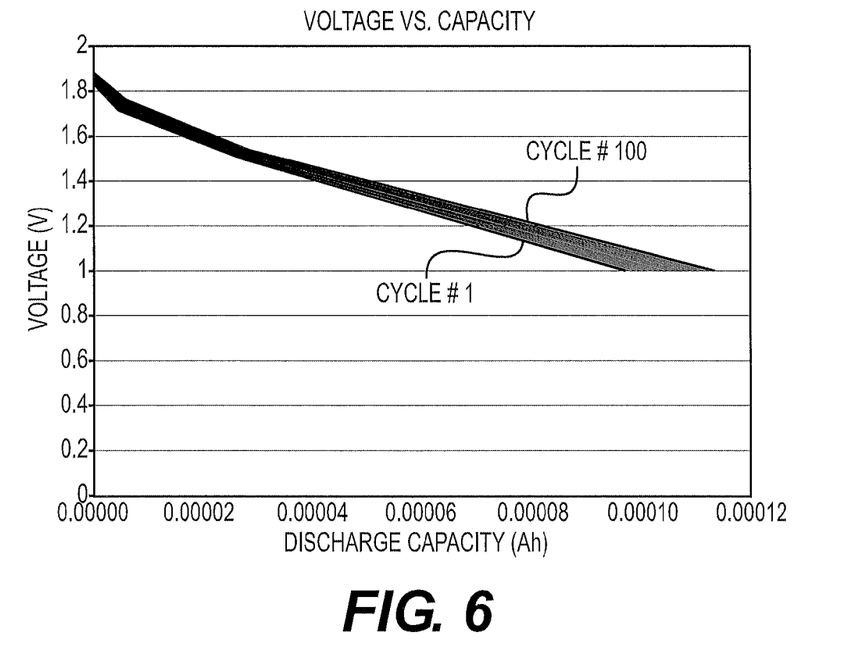
FIG. 6 is a graph of a discharge curve for a MLCB battery cell with indium tin oxide anode and lithium cobalt oxide cathode.

Cathode solution #1 was applied to the opposite porous element and it was also dried similarly to the anode at 125° C. The anode and cathode materials were transformed to oxides by placing the cell structure into a preheated kiln at 700° C. for 5 minutes. Wires were applied and the cell charged by the same procedure as outlined in Example 2. The results were approximately the same as in Example 2, with voltage of about 3.6-3.7 volts and sufficient current to light the LED. This cell was also capable of recharging (FIG. 6).

Example 4

Multi Layer Battery Made by all Tape Process

A multilayered battery consisting of several parallel cells was created using the tape with hole cutting procedure as disclosed in Example 2. However the holes cut were square rather than round and were offset slightly from one another so there was an area where they overlapped one another but extended outside to the sides. Also rather than consisting of one set of porous/dense/porous layer, the pattern was repeated alternating the offset of the electrode from one side to the other until there were 5 dense electrolyte layers resulting in 5 parallel electrolytic cells and the structure was generally as shown in FIG. 4.

After firing the structure at 1000° C., the anode solution #2 was introduced from one side by dipping the very end of the structure into a shallow pool of anode solution #2. Capillary action was sufficient to fill the porous layers connected to the one side of the structure. The structure was dried at 125° C. and the opposite end of the structure was dipped into a shallow pool of cathode solution #1 and dried at 125° C. Again capillary action was sufficient but it should be recognized that placing the part into a chamber while the end is still submerged in the cathode solution and pulling a vacuum could hasten the process. In addition it should also be recognized the degree of filling of the pores can be changed by either the concentration of the anode and cathode precursors or by more than one cycle of saturating the pores and drying.

Figure 7:
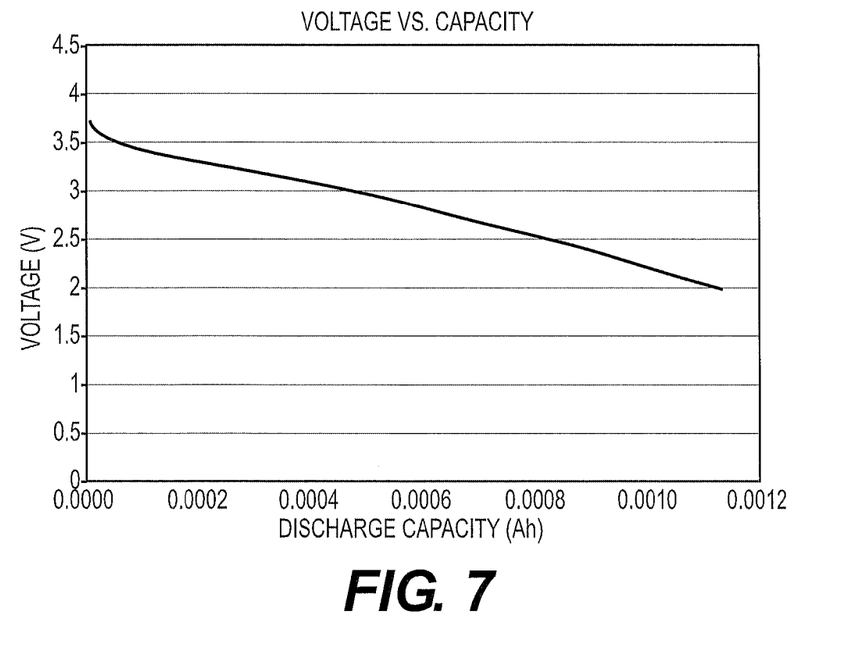
FIG. 7 is a graph of a discharge curve for a two-cell MLCB battery with indium tin oxide (ITO) anode and lithium cobalt oxide ($LiCoO_2$) cathode.

Finally the structure was placed into a preheated 700° C. kiln for about 10 minutes. The outside electrical connection was made by dipping the ends of the structure into a conductive epoxy similar to that used in Example 2. Wires were also attached by use of the conductive epoxy. The battery was charged in approximately the same manner as disclosed in previous examples and the performance was similar to Examples 2 and 3 generating about 3.6 volts and sufficient current to light the LED (FIG. 7). Further the battery could be charged multiple times.

It should also be noted that the connection at the end of the structure could also be obtained by dipping into a metal filled glass and firing to make a hermetic seal, which could later be plated and or soldered using methods developed in the MLCC technologies.

Example 5

Multi Layer Battery Made by all Tape and Screen-Printing Paste Process

A structure similar to the structure created in Example 4 above was created by a different method based on methods commonly used to make MLCC devices.

In this case screen-printing dense and porous LATP pastes onto Tape #1 in a pattern to produce the structure. The dense paste was created by mixing together 94.13 g of LATP, 1.95 g of PL005, 10.06 g of YM35, 11.74 g of AD036, 74.56 g of XA1-2 acrylic paste vehicle from PII and 39.64 g of paste thinner TS33 from PII.

A porous paste was created by taking 58.35 g of the above-produced dense paste and adding 29.98 g of dry 7 micron diameter cross-linked PMMA beads and 11.67 g of TS32 thinner followed by three roll milling loosely with the goal of dispersing the PMMA beads but not crushing them. Appropriate dispersion can be confirmed by use of FOG (fineness of grind) gauge, which will show a break of about 1-2 microns but many scratches up to about 8 microns.

The structure was created by screen printing porous paste on to a piece of dense Tape #1 using a screen printing pattern designed to create electrode areas separated by borders on several sides which later will be filled with dense paste. This method and equipment is based on methods known in the art to create MLCC devices.

The dense paste can be printed and dried and reprinted to give the desired thickness. In this Example #5, the dense tape is about 30 microns and the porous paste is printed and dried twice to give about 50 microns thickness. At this time the paste is changed to dense paste, which is printed in the negative pattern of the porous electrode layer to allow filling in the borders around the porous electrodes. This layer is also printed twice to provide the same level as the porous electrode prints. For this example the porous and dense printing sequence was repeated again to build up further thickness in the porous electrodes. As described above, a single layer of tape was printed but in practice it is usually repeated several times so a larger number of tapes are printed one after the other.

For this Example 5 sheets of printed tapes were produced. The entire procedure was repeated again but with a new set of screens which are similar to the first set of screens except they are offset slightly so that when laid on top of the previous prints there will be some overlap area and the electrode prints will extend off in opposite directions. One print pattern is commonly called print A and the other print B.

Following the above practice, five sheets of print B are formed and dried. Finally the structure is built up by placing five blank sheets of dense Tape #1 on top of one another to form one side of the final package (called cover sheets) followed by laying down a print A, followed by a blank dense Tape 1, followed by a print B, then blank dense Tape 1 and so on until all five A and B printed tapes are used.

Finally five more blank dense sheets are placed on top of the stack to form the top coversheet and the entire structure was laminated at 5000 psi, 70° C. for about 10 minutes or more. Although it is possible to create individual parts this way, the typical method analogous to MLCC practice is to design the screen-printing pattern to make many units all in one piece which can later be cut into individual discrete devices. In this Example the bar size was about 4.5 inches by 5 inches and after cutting along the appropriate regions with a guillotine style heated cutter 60 individual unfilled MLCBs resulted. Several of these unfilled MLCBs were placed in a kiln and fired at 1000° C. for a half hour in air.

After firing, these devices are ceramic chips with the porous print A fired layers emerging from one end of the chip and print B set emerging from the other end of the chip. Neither A nor B prints emerge from the sides of the chip. The A and B layers have overlap areas on opposite sides with the dense electrolyte layers in-between but do not touch each other within the chip structure.

Finally one side of the chip (for example A side) is dipped into anode solution #2, dried and the other side (B prints) of the chip dipped into cathode solution #1, dried and the chip fired. This dipping, impregnating, drying, firing and end termination procedure is described in more detail under Example 4. The testing and results were also approximately the same as given under Example 4.

Example 6

Multi Layer Battery Containing Internal Metal Current Collectors

A further Example was created using the same general procedure as given in Example 5 except after two prints of the Print A porous electrode, a layer of Pt-containing paste was printed using the same pattern. Said Pt-containing paste was made by combining 27.5 g of commercial Pt fine metal powder with 17.5 g of acrylic paste vehicle XA2-1F, 0.5 g of PL005, 1.7 g of Z1 sinter controller and 2.8 g of thinner TS33 (all from PII except for Pt metal powder).

This paste mixture was milled on a three roll mill using standard methods to make the conductive internal Pt metal paste. Following the printing of the Pt paste with the A pattern screen, the dense boundary paste layer was applied, followed by printing of two more porous electrodes and two more dense boundary layers to finish the printed sheet. The procedure was repeated for the B print sheets.

All other construction methods are substantially the same as in Example 5. The difference between Example 5 and Example 6 is the inclusion of a thin but continuous metal layer within the porous A and B prints. This conductive layer then will join up with the appropriate end of the chip and later join with the end termination materials. The purpose of these internal current collectors is to increase electronic conduction within the battery for higher performance or for use with anode or cathode materials, which are less electronically conductive. The testing procedure and results were approximately the same for Example 6 as they were with Example 5.

Example 7

MLCB Battery with LAGP

A three-layer cell was constructed as described in Example 2 with the exception that the electrolyte used was lithium aluminum germanium phosphate (LAGP or $Li_{1.5}Al_{0.5}Ge_{1.5}(PO_4)_3$), the cathode active material was spinel lithium manganese oxide of the formula, $LiMn_2O_4$ and the firing temperature of the LAGP was 850° C. for a half hour.

The tapes were made with solvent based acrylic binder using the formulas given here. The dense tape was produced by placing 42.26 g of LAGP powder and mixing in a ball mill with 3.03 g of plasticizer PL028, 1.14 g of dispersant DS018, 0.37 g of dispersant DS019, 13.88 g of MEK and 13.89 g of methyl acetate solvents and ball milling for 40 hours.

After 40 hours the ball mill was opened up and 25.43 g of a solvent acrylic binder solution consisting of 8.43 g of acrylic binder SB100 pre-dissolved in 17 g of MEK was added, and the ball milling continued for 4 more hours, after which it was drained and tape cast to yield approximately 30 micron thick cast tape. All of these DS, PL and SB products are available from PII.

Similarly the porous LAGP tape was produced by placing in a ball mill 27.05 g of LAGP powder, 2.35 g of PL028, 0.8 g of DS018, 0.26 g of DS019, 6 g of acetone and 14 g of isopropanol and ball milling for 40 hours.

After 40 hours of milling the mill is opened and 33 g of a solution of 20% SB100 pre-dissolved in a mixture of 30/70 acetone/isopropanol was added to the mill along with 9 g of additional acetone and 21 g of isopropanol, the mill closed and mixing continued for 2 more hours. The mill was opened and 18 g of 2 micron cross linked PMMA beads were added and the mill closed and mixed for 1 hour. Finally after the beads were mixed for 1 hour the mill was opened and the slurry drained and immediately cast into 30 micron thick tape.

The cell was further formed after the LAGP firing by adding the carbon as explained in Example 2 and then forming the cathode. The cathode solution was prepared by adding 0.51 g of lithium acetate dihydrate ($C_2H_3O_2Li\ 2\ H_2O$) and 1.79 g of manganese nitrate hydrate ($Mn(NO_3)_2 \times H_2O$) to 1 gram of deionized water. This solution was used to fill the pores of the cathode side of the cell, followed by drying of the water from the cell at 125° C. and subsequent firing at 400° C.

Figure 8:
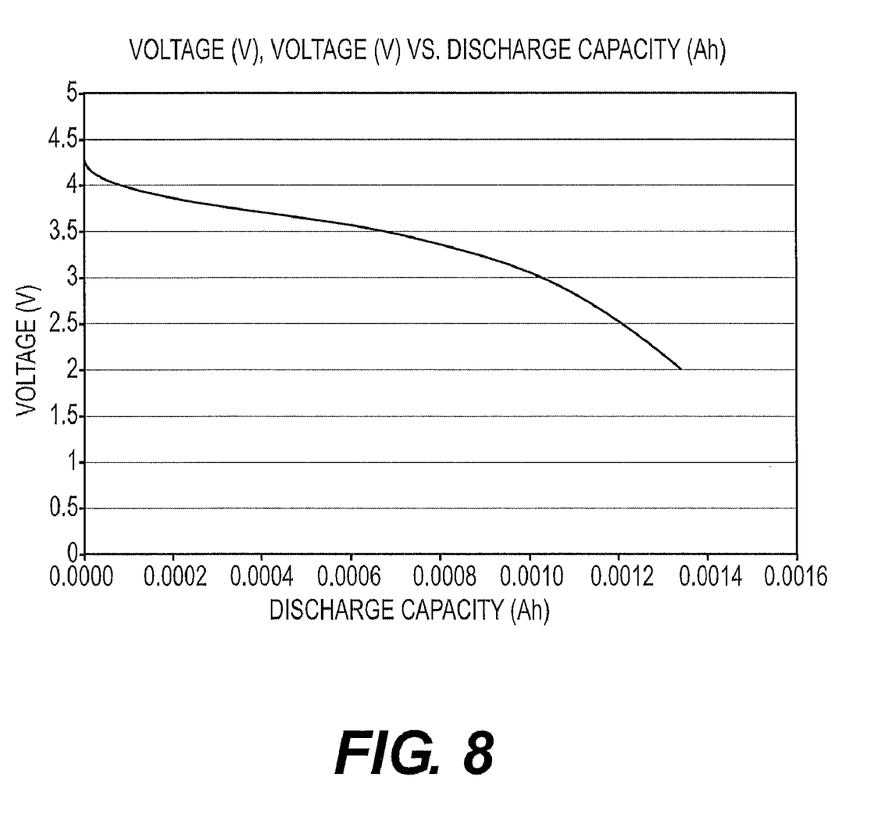
FIG. 8 is a graph of a discharge curve for a MLCB battery cell with carbon anode and spinel lithium manganese oxide ($LiMn_2O_4$) cathode and LAGP electrolyte.

The discharge data for the MLCB cell thus created is shown in FIG. 8), and demonstrates high voltage due to the carbon anode, the manganese oxide cathode and the stable LAGP electrolyte.

Advantages of the Present Invention

The invention provides a practical ceramic battery containing no hazardous organic compounds composed of at least three layers each of anode, solid electrolyte and cathode. An MLCB in accordance with the invention need not contain any hazardous, flammable or combustible materials to obtain good performance.

The invention can comprise a single trilayer cell or a plurality of such many trilayer cells arranged together in a stack to be considered a multilayered ceramic battery or MLCB.

Embodiments of the invention providing increased current capabilities are obtained by using a sandwich structure for the basic trilayer cell unit. Said structure consists of a dense layer of LATP sandwiched in-between two layers of porous LATP or other lithium ion conducting solid electrolytes. The porous LATP becomes an ionically conductive conduit to facilitate the conduction of ions from the anode, through the electrolyte and into the bulk of the cathode layer. These pores are prepared by compounding pore formers such as solid or hollow acrylate beads, carbon particles or other particles, which will be removed upon firing into the LATP tape or paste in air. During binder burnout (BBO), pores are formed when the beads burn out. Size of pores and relative porosity can be easily controlled. Later these pores are filled with anode precursors on the anode side and cathode precursors on the cathode side and then they are converted to anode and cathode active materials by appropriate reactions, for example thermal treatment at desired temperatures.

In the invention, cathodes and anodes are selected from typical Li-ion battery electrode active materials, which preferably also conduct electrons or are made electronically conductive by adding conducting materials for good current capability.

The present MLCB typically can contain current collector layers and end terminations for connection to circuits in a manner similar to other chip components.

The MLCB structure of the invention, being composed of glass and ceramic, effectively forms it's own battery structure, and therefore does not require an additional sealing structure. Such a structure is problematic in conventional Li ion batteries, since it must have a metal can which is leak resistant to internal solvents and outside atmosphere.

The cells within an MLCB of the present invention can be arranged in series (for higher voltage) or in parallel (for higher current potential).

The layers of the present MLCB can easily be varied in thickness from around a micron to hundreds of microns for different electrical performance.

MLCB manufacturing in accordance with the invention can be conducted in normal ambient production conditions, not needing special dry environments or hermetic packaging like typical for manufacturing Li-ion batteries.

MLCBs of the invention can be substituted and assembled on electronic circuit boards using standard methods for MLCC and can tolerate soldering.

As an MLCB embodiment of the invention uses no organic materials and a solid electrolyte, it can operate at temperatures far greater than possible by standard Li-ion batteries.

An MLCB embodiment of the invention can be produced by a wet process (all screen printing, other printing, water fall and screen printing) or semi wet process using a combination of ceramic tape casting and paste screen printing methods known in the art.

Since there is no flammable electrolyte or other liquids, the present MLCB should be safe to over charge, and pass puncture and crush tests, which are a significant problem with standard Li ion batteries as demonstrated by the fact that due to various hazards, consideration has been given to banning conventional rechargeable electronic devices from passenger air flights.

The pores in MLCBs of the invention can be filled to various levels, thus balancing energy storage and room for stress relief during anode or cathode expansion and contraction.

All patents and patent applications cited in this specification are hereby incorporated by reference as if they had been specifically and individually indicated to be incorporated by reference.

Although the foregoing invention has been described in some detail by way of illustration and example for purposes of clarity and understanding, it will be apparent to those of ordinary skill in the art in light of the disclosure that certain changes and modifications may be made thereto without departing from the spirit or scope of the appended claims.

We claim:

1. A solid-state multi layer ceramic battery comprising at least one multi-layer cell structure wherein said multi-layer cell structure comprises:

a porous sponge ceramic anode layer comprising a plurality of pores formed within a ceramic material, at least a plurality of said pores being only partially filled and being coated with at least one anode active material;

a porous sponge ceramic cathode layer comprising a plurality of pores formed within a ceramic material, at least a plurality of said pores being only partially filled and being coated with at least one cathode active material; and a dense ceramic electrolyte layer positioned between said porous sponge ceramic anode layer and said porous sponge ceramic cathode layer.

2. The multi layer ceramic battery of claim 1 wherein said ceramic layers are lithium ion-conducting solid ceramic electrolytes.

3. The multi layer ceramic battery of claim 1 wherein said at least one anode active materials comprises at least one material selected from the group consisting of lithium intercalating carbonaceous materials, lithium intercalating transition metal oxides, and lithium alloy materials.

4. The multi layer ceramic battery of claim 3 wherein said lithium intercalating carbonaceous material comprises at least one material selected from the group consisting of graphite, hard carbon, and carbon nano tubes.

5. The multi layer ceramic battery of claim 3 wherein said lithium intercalating transition metal oxide comprises at least one material selected from the group consisting of molybdenum oxide, tungsten oxide, ruthenium oxide, titanium oxides, indium tin oxide, lithium titanium oxide of the composition, $Li_xTiO_2$ and lithium titanium oxide of the composition $Li_4Ti_5O_{12}$, wherein the letter x is an integer number.

6. The multi layer ceramic battery of claim 3 wherein said lithium alloy materials comprise at least one material selected from the group consisting of $Li_xSi$, $Li_ySn$, and $Li_zAl$, wherein the letters x, y, and z are integer numbers.

7. The multi layer ceramic battery of claim 1 wherein said at least one cathode active material comprises at least one material selected from the group consisting of Li intercalating electrode materials, metal phosphates, lithium vanadium oxides having the formula $Li_xV_2O_5$, and lithium titanium oxides having the formula $LiTiO_2$, wherein the letters x and y are integer numbers.

8. The multi layer ceramic battery of claim 7 wherein said Li intercalating electrode materials comprise at least one material selected from the group consisting of $LiCoO_2$, $LiNiO_2$, $LiNi_xCo_yO_2$, $LiMn_2O_4$, $LiNi_{0.5}Mn_{1.5}O_4$, $LiNi_xCo_yMn_zO_2$, and $LiFePO_4$, wherein the letters x, y, and z are integer numbers.

9. The multi layer ceramic battery of claim 7 wherein said metal phosphates comprise at least one material selected from the group consisting of $LiCoPO_4$ and $LiNiPO_4$.

10. The multi layer ceramic battery of claim 2 wherein said lithium ion-conducting solid ceramic electrolytes comprise materials selected from the group consisting of lithium aluminum titanium phosphate (LATP) and its derivatives obtained by replacing some or all of the titanium with an element selected from the group consisting of silicon, germanium, zirconium, zinc, and lithium phosphorus oxynitride (LIPON).

11. The multi layer ceramic battery of claim 2 wherein at least one of said lithium ion-conducting solid ceramic electrolytes is lithium aluminum titanium phosphate (LATP).

12. The multi layer ceramic battery of claim 2 wherein at least one of said lithium ion-conducting solid ceramic electrolytes is lithium aluminum germanium phosphate (LAGP).

13. The multi layer ceramic battery of claim 1 further comprising a plurality of three-layer cell structures connected in series to form a higher voltage battery wherein at least two of said three-layer cells each comprise a porous sponge ceramic anode layer comprising at least one anode active material, a porous sponge ceramic cathode layer comprising at least one cathode active material, and a dense ceramic electrolyte layer positioned between said anode layer and said cathode layer.

14. The multi layer ceramic battery of claim 1 further comprising a plurality of three-layer cell structures connected in parallel to form a higher capacity battery wherein at least two of said three-layer cells each comprise a porous sponge ceramic anode layer comprising at least one anode active material, a porous sponge ceramic cathode layer comprising at least one cathode active material, and a dense ceramic electrolyte layer positioned between said anode layer and said cathode layer.

15. A solid-state multi layer ceramic battery comprising at least one multi-layer cell structure wherein said multi-layer cell structure comprises:

a porous sponge ceramic anode layer comprising at least one anode active material and a plurality of pores within the at least one anode active material, at least a plurality of said pores being only partially filled;

a porous sponge ceramic cathode layer comprising at least one cathode active material and a plurality of pores within the at least one cathode active material, at least a plurality of said pores being only partially filled; and a dense ceramic electrolyte layer positioned between said porous sponge ceramic anode layer and said porous sponge ceramic cathode layer.

16. A solid-state multi layer ceramic battery comprising at least one multi-layer cell structure wherein said multi-layer cell structure comprises:

a porous sponge ceramic anode layer comprising at least one anode active material and a plurality of pores within the at least one anode active material, at least a plurality of said pores being only partially filled and having a coating which increases the electronic and ionic conductivity of the ceramic anode layer;

a porous sponge ceramic cathode layer comprising at least one cathode active material and a plurality of pores within the at least one cathode active material, at least a plurality of said pores being only partially filled and having a coating which increases the electronic and ionic conductivity of the ceramic cathode layer; and a dense ceramic electrolyte layer positioned between said porous sponge ceramic anode layer and said porous sponge ceramic cathode layer.

* * * * *

UNITED STATES PATENT AND TRADEMARK OFFICE
CERTIFICATE OF CORRECTION

PATENT NO. : 8,304,115 B1
APPLICATION NO. : 12/584065
DATED : November 6, 2012
INVENTOR(S) : Kostadin Petkov et al.

It is certified that error appears in the above-identified patent and that said Letters Patent is hereby corrected as shown below:

Title Page, item (73), change assignee from

"CERMACELL, LLC" to --CERAMACELL, LLC--

Signed and Sealed this
Twenty-ninth Day of January, 2013

David J. Kappos
*Director of the United States Patent and Trademark Office*